United States Patent Office 3,532,936
Patented Oct. 6, 1970

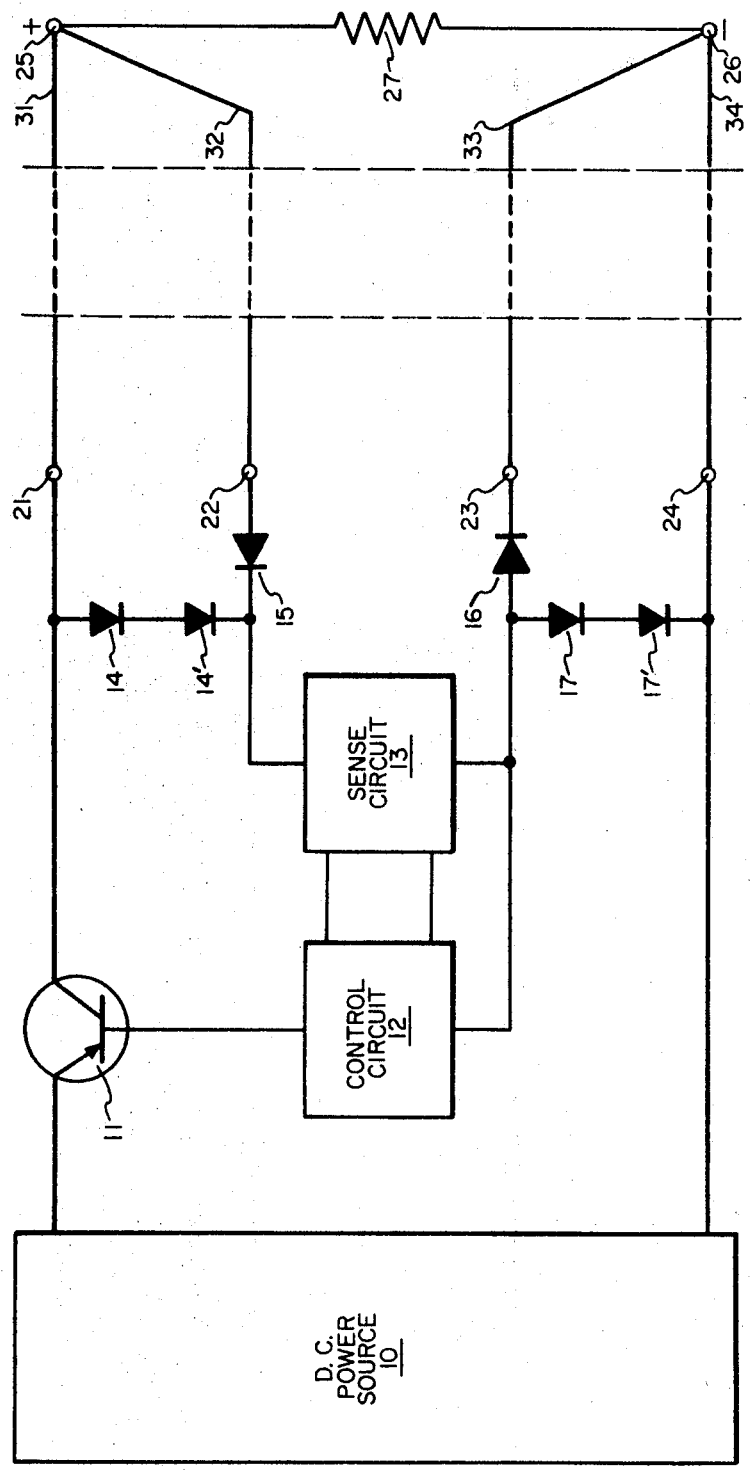
INVENTOR.
KARL H. KUSTER

1

3,532,936
PROTECTIVE CIRCUIT FOR DIRECT CURRENT VOLTAGE REGULATORS
Karl H. Kuster, Franklin Park, Ill., assignor to Automatic Electric Laboratories, Inc., Northlake, Ill., a corporation of Delaware
Filed Jan. 14, 1969, Ser. No. 791,021
Int. Cl. H02h 9/04
U.S. Cl. 317—31                              5 Claims

ABSTRACT OF THE DISCLOSURE

A protective circuit for D.C. power supplies of the type that have sensing leads extending between the power supply and the load, in addition to the current carrying leads. Protection is provided by means of diodes against accidental opening of either the current carrying leads or the sensing leads, which would ordinarily result in damage to either load or power supply components.

BACKGROUND OF THE INVENTION

Field of the invention

This invention relates to new and useful improvements in protective circuitry for regulated power supplies and particularly to circuitry for protecting a regulated power supply and its associated load against accidental opening of current handling leads or sensing leads extending between the power supply and associated load.

Description of the prior art

Regulated power supplies are well known. It is also well known that where regulated power supplies are employed and some distance separates power supply and load, to employ a remote sensing scheme. A regulated D.C. power supply employing such a sensing scheme is disclosed in U.S. Pat. 3,440,319 to Frederick A. Stich. U.S. Pat. 3,098,198 to E. Levy Jr. et al. discloses circuitry for protecting the load associated with the regulated power supply against accidental opening of the sense leads. This method is also discussed in the Sorenson Controlled Power Handbook, page 31. The use of circuitry to protect both current handling and sensing leads against accidental opening is not disclosed in the prior art.

SUMMARY OF THE INVENTION

To provide adequate protection against opening of either current handling leads or remote sense leads, the present invention employs protective diodes connected between small gauge wire sense leads and heavy gauge wire current carrying leads of like polarity at the power supply. This provides a measure of protection against accidental opening of the associated sense lead. If a sense lead were to be opened without inclusion of these diodes, the voltage would rise to its maximum value, possibly damaging the load. By inclusion of these diodes potential is conducted from the current carrying leads to the sensing circuit and local sensing effectively takes place.

2

If the small gauge wire remote sense lead remains intact and the associated current handling lead is open the remote sense lead then attempts to carry the load current from power supply to the load, with possible overheating and resultant damage occurring. In the present invention protection is also provided against the accidental opening of the current handling leads. Appropriately poled diodes are included in the sense leads between the load and the associated sensing circuit, blocking current flow from power supply to load through the sense leads.

BRIEF DESECRIPTION OF THE DRAWING

The single figure of the accompanying drawing is a diagram of a regulated D.C. power supply connected to a load including protective circuitry in accordance with the present invention.

DESCRIPTION OF THE PREFERRED EMBODIMENT

In the accompanying drawing a regulated power supply operating from a D.C. power source is shown. The configuration shown is like that disclosed in U.S. Pat. 3,098,192 in which a transistor is employed as a series control element between a source of D.C. power and a load.

A D.C. power source 10 (which may be a battery or rectified A.C.) is shown connected to a load 27. The sensing circuit 13 containing a voltage reference is connected to sensing terminals 22 and 23. The output of the sensing circuit 13 is connected to a control circuit 12 whose output is connected to the base of transistor 11 (which acts as a series element) to control its resistance. Connected between terminal 21 and sense circuit 13 are two rectifiers 14 and 14' and between conductor 24 and sense circuit 13 are another two rectifiers 17 and 17'. These rectifiers act only in the case that conductors 32 and 33 respectively leading from terminals 22 and 23, to the load are broken. Additional rectifiers 15 and 16 are included in the connections between terminals 22 and 23, and the sense circuit 13. These rectifiers act in case the current handling leads 31 and 34 are opened, to prevent sense leads 32 and 33 from attempting to carry current to the load 27.

Operation of the present circuit is as follows: Under normal circumstances positive potential is connected to transistor 11 which may be controlled to vary considerably in resistance. The load 27 has its positive terminal 25 connected to terminal 21 of the regulator circuit by conductor 31 which carries the load current. In a similar manner conductor 34 carries load current between the negative regulator terminal 24 and the negative load terminal 26.

As the load varies, current through conductors 31 and 34 varies considerably and the voltage drop between the regulator terminals and the load terminals varies in like manner due to conductor resistance. In order to compensate for this voltage drop a second set of conductors 32 and 33 are provided which connect from the load terminals 25 and 26 respectively to the sensing circuit 13 at terminals 22 and 23.

This arrangement of dual conductors works well for any distance but is especially effective when the load and voltage regulator are separated by conductors which have a resistance sufficient to provide a voltage drop less than the drop across either rectifiers 14 and 14' or 17 and 17'. When this condition exists current flows from terminal 21 over conductor 31 to terminal 25 back over conductor 32 to terminal 22 and through rectifier 15 to the sensing circuit 13. A similar circuit exists on the negative side of the supply. Current flows through conductors 34 and 33, to terminal 23, from there through rectifier 16 to the sense circuit 13.

If the voltage drop around these loops is greater than the voltage drop across diodes 14 and 14' and 17 and 17' respectively, the current will then flow directly from terminal 21 to the sensing circuit 13, and also from terminal 24 to the sensing circuit 12 and thus not provide an accurate sampling of load voltage. If either conductor 32 or 33 is broken or if they become disconnected, at either end, current will then flow through the diodes 14 and 14' and 17 and 17' and exhibit a load voltage which is either one or two volts greater than the desired load voltage, because of the greater drop across diodes 14 and 14' and 17 and 17'.

If the diodes 14 and 14', and 17 and 17', are not in the circuit as shown, and a break occurs in either one or both of conductors 32 and 33 to show a zero voltage across the load; the sensing circuit 13 and the control circuit 12 would act to reduce the passing impedance of transistor 11, which could then apply a high voltage across the load terminals. This might damage load 27 or other components of the sensing and amplifier circuitry. With the diodes 14 and 14', and 17 and 17' connected in the circuit as shown the load voltage cannot rise more than two volts above the desired value.

In some applications where conductors 31 and 34 are quite long the voltage drop around loops 31 and 32 and 33 and 34 may be greater than the voltage drops across the double diodes 14 and 14' and 17 and 17'. In this case additional diodes may be added to the diodes shown in the drawing. Depending on how many rectifier diodes are connected between terminals 21 and the sense circuit, and terminal 24 and the sense circuit, the increase in voltage due to a conductor break will be the difference between the voltage drop around the conductor loop, such as 31 to 32, and the drop across the rectifier units.

Now if either of the load current carrying leads 31 and 34 are opened, lead 32 or 33 would then attempt to furnish load current by way of a path extending through rectifiers 14 and 14' or rectifiers 17 and 17'. Without the presence of diodes 15 and 16 this would be possible. Low current handling diodes 14 and 14' and 17 and 17' and the small guage wire conductors 32 and 33 undoubtedly would be damaged under these circumstances.

Other possible failures could also be evidenced if either sense lead 32 or 33 were closed to an output lead of the opposite polarity such as lead 32 to lead 34 or lead 33 to lead 31. This would cause destruction of diodes 14 and 14' or 17 and 17' respectively. If both sensing leads 32 and 33 were shorted together and not connected to the load diodes 14 and 14' and 17 and 17' would be destroyed. By inclusion of diodes 15 and 16 in protective circuitry in accordance with the present invention, diodes 15 and 16 perform an isolation function when the above faults occur. Opening of the heavy current handling leads 31 and 34 no longer presents the possibility of overheating of sensing leads that exists in the prior art sensing techniques.

In prior art protective circuitry a single diode was usually employed between the current handling terminals such as 21 and 24 and the sensing circuit 13. Because of the inclusion of protective diodes 15 and 16 it becomes necessary to employ at least one additional diode in each circuit connection between the current handling output terminals and the sense circuit. For this reason diodes 14' and 17' are included in the present circuit.

By inclusion of diodes 14' and 17' the forward voltage drop of diodes 15 and 16 respectively are compensated for. The inclusion of diodes 14' and 17' is predicated upon each of the included diodes in the circuitry all having essentially the same forward voltage drop. Selection of single diodes to replace the combinations of diodes 14 and 14' and 17 and 17', require diodes having a forward voltage drop greater than the entire voltage drop existing in the loop. An example being the drop in the loop from terminal 21 over conductor 31 and conductor 32 through diode 15 to the sense circuit. It has generally been found more expedient to employ diodes of similar characteristics in the protective circuitry disclosed in the present invention.

In selecting diodes such as 14 and 14', and 17 and 17' the forward-drop characteristics should be selected for individual or combinations of diodes so that the sampling voltage is equal to the output voltage appearing across terminals 25 and 26, exclusive of the forward voltage drop of diodes 15 and 16.

Details of a sensing circuit and control circuitry which might be employed in the present regulator are fully within the teaching of the prior art. For example, details of such a sense circuit and control circuit or control amplifier are shown in U.S. Pat. 3,098,192. These details however are referred to by way of example and should not be regarded as any limitation on the present invention.

In sensing circuit 13, if the conventional arrangement of a differential amplifier, with one input connected to a source of reference voltage and the other connected to a voltage divider across the sensing circuit input is employed (as shown in FIG. 2 of the above referenced Levy patent) it may be desirable to include temperature compensating means to provide the necessary compensation for the forward voltage variation (diode junction temperature drift) of diodes 15 and 16. If this is done the forward voltage variation of diodes 15 and 16 will induce no error in the sampling voltage.

It is totally within the scope of the present invention that a regulated power supply of the switching type might also be employed in the present invention. If a switching form of regulator were employed, the addition of a rectifier and filter circuitry would also be required. Proper implementation of a switching type regulator in view of the present disclosure would be obvious.

The foregoing disclosure and drawings are merely illustrative of the principles of this invention and are not to be interpreted in a limiting sense. Obviously considerable modification of the present protective circuitry for regulated D.C. power supplies, wherein load voltage is sensed at some distance from the power supply is apparent, and falls within the scope of the present invention.

What is claimed is:

1. A voltage regulator circuit, connected between a direct current power source, which may vary in applied voltage, and a direct current load, to supply a voltage with a restricted range of values to said load, said regulator circuit including: a plurality of load terminals connected to said load by means of circuit conductors; a passing impedance coupled between said source and one of said load terminals for stabilizing said load voltage; a sensing circuit having an error voltage as the output thereof, indicating whether the actual load voltage is above or below a desired load voltage, said output controlling said passing impedance; and a protective circuit comprising, a pair of sensing circuit terminals each connected to said sensing circuit by at least one rectifier diode, and each connected to said load by a circuit conductor, for determining the voltage across said load, and at least one diode rectifier connected between each of said load terminals and said sensing circuit.

2. A protective circuit as set forth in claim 1 wherein said load terminals and said sensing circuit terminals are connected to said load by means of extended conductors.

3. A protective circuit as set forth in claim 2 wherein said load conductors connecting said load terminals to said load carry all load current.

4. A protective circuit as claimed in claim 2 wherein the voltage drop through said conductors connecting said load terminals and said sensing terminals to said load is less than the voltage drop through said diode rectifiers connected between said load terminals and said sensing circuit.

5. A protective circuit as set forth in claim 2 wherein during normal operation of said circuit all sensing current flows through said conductors connecting said sensing terminals to said load.

References Cited

UNITED STATES PATENTS 3,098,192  7/1963  Levy et al. _____ 323—22
3,210,646  10/1965  Schauwecker _____ 323—9

J D MILLER, Primary Examiner

H. E. MOOSE, Assistant Examiner

U.S. Cl. X.R.

317—33; 323—22